No. 877,268. PATENTED JAN. 21, 1908.
D. C. VAN BUREN.
POLE BRACE.
APPLICATION FILED OCT. 3, 1907.

2 SHEETS—SHEET 1.

WITNESSES:
E. W. Stewart
L. V. Acker

Dennis C. Van Buren, INVENTOR

By C. A. Snow & Co.
ATTORNEYS

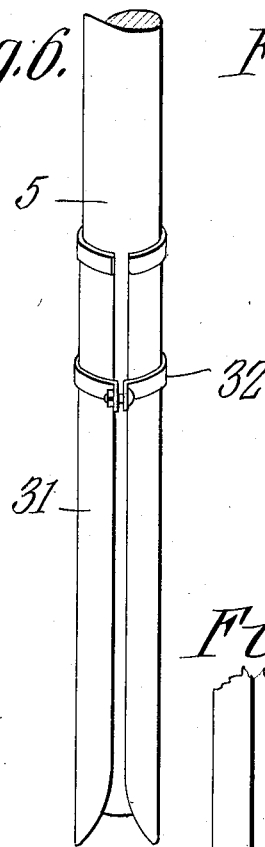
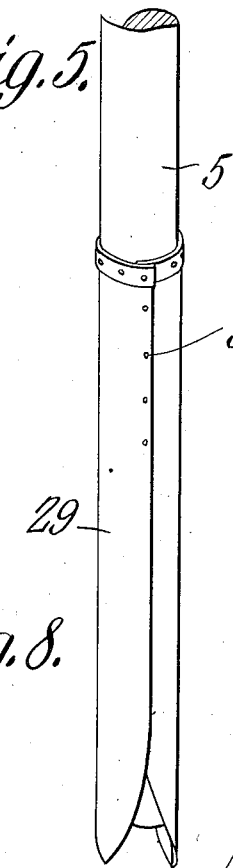
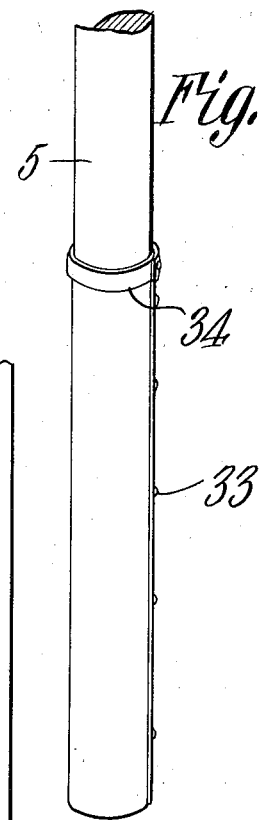
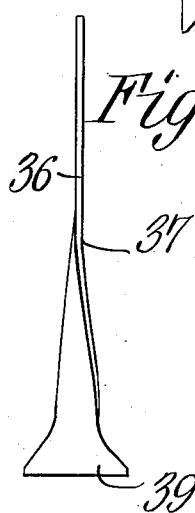
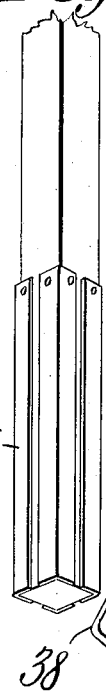

UNITED STATES PATENT OFFICE.

DENNIS C. VAN BUREN, OF GRANGEVILLE, IDAHO.

POLE-BRACE.

No. 877,268.

Specification of Letters Patent.

Patented Jan. 21, 1908.

Application filed October 3, 1907. Serial No. 395,702

*To all whom it may concern:*

Be it known that I, DENNIS C. VAN BUREN, a citizen of the United States, residing at Grangeville, in the county of Idaho and State of Idaho, have invented a new and useful Pole-Brace, of which the following is a specification.

This invention relates to telephone poles, telegraph poles, fence posts and similar supports and more particularly to means for reinforcing and strengthening the base of the pole so as to prevent the same from rotting and breaking off at the ground line.

The object of the invention is to provide a casing or housing adapted to be driven in the ground at the base of the pole or secured to the pole before the latter is set into the ground, thereby to reinforce and strengthen a weak or decayed portion of the pole and thus prevent the same from falling over as well as to lengthen the period of usefulness of said pole.

A further object is to provide means for securing the casing or housing in position on the pole, and means for bracing the latter.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

Figure 1:
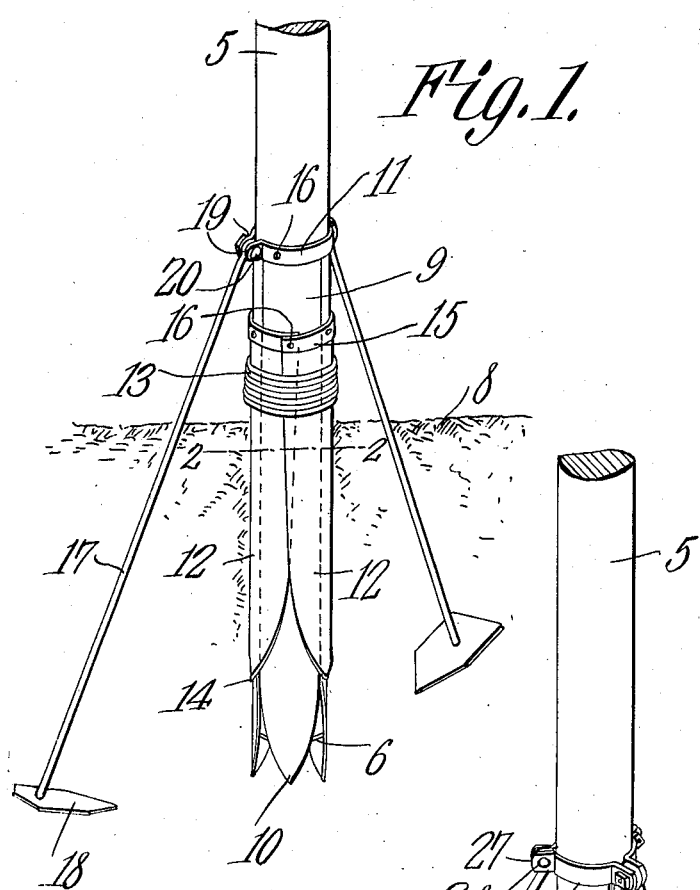
Figure 3:
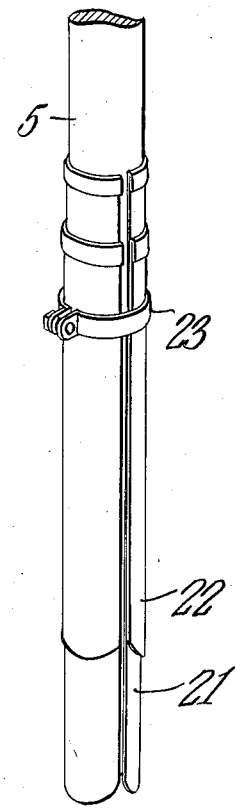
Figure 2:
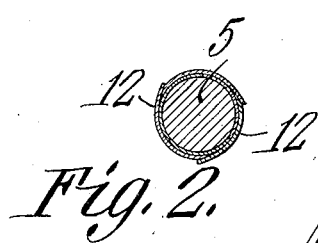
Figure 4:
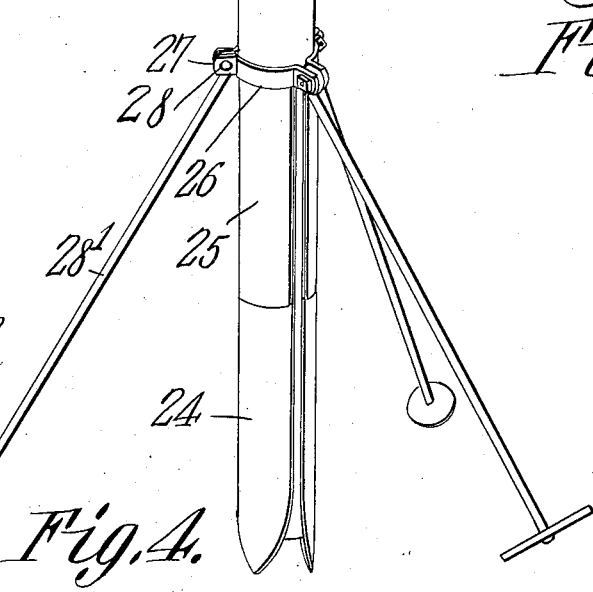

In the accompanying drawings forming a part of this specification: Figure 1 is a perspective view of the lower portion of a telegraph pole provided with a casing or housing constructed in accordance with my invention. Fig. 2 is a transverse sectional view taken on the line 2—2 of Fig. 1. Fig. 3 is a perspective view illustrating a modified form of the invention. Fig. 4 is a similar view illustrating a further modification. Figs. 5 to 9 inclusive are perspective views illustrating further modifications. Fig. 10 is a front elevation of one of the brace bars shown in Fig. 9.

Similar numerals of reference indicate corresponding parts in all of the figures of the drawings.

The improved device forming the subject matter of the present invention is principally designed for use in connection with telephone poles, telegraph poles, fence posts and similar supports for reinforcing and strengthening the pole at the ground line, and by way of illustration is shown in connection with a telegraph pole of the ordinary construction in which 5 designates the pole, the lower end of which may be curved or rounded as indicated at 6 and driven or otherwise embedded in the ground 8.

The invention consists of a casing or housing preferably formed of a plurality of metallic strips 9 curved to conform to the curvature of the adjacent walls of the pole so as to form a housing for the pole and thus assist in preventing the latter from rotting or decaying when placed in position on the pole before the latter is set into the ground.

The lower ends of the plates 9 are extended longitudinally beyond the cur ed end 6 of the pole and inclined or beveled to form terminal piercing points 10, while the upper ends of the plates 9 are bent upon themselves to form annular reinforcing flanges 11 which constitute driving heads when the casing or housing is placed on the pole after the latter has been embedded in the ground.

The upper end of the casing or housing preferably extends a short distance above the ground line so as to reinforce and strengthen the pole and thus prevent the same from falling over should that portion of the pole be decayed or otherwise injured from constant exposure to the elements Surrounding the plates 9 is an auxiliary casing or housing the plates 12 of which over-lap the adjacent longitudinal edges of the plates 9 so as to prevent the moisture from penetrating the inner casing or housing and rotting or decaying the base of the pole as well as to reinforce and strengthen said pole.

The plates 12 forming the outer or auxiliary housing are preferably of less length than the plates 9 of the inner casing or housing and are rigidly combined therewith by a binding wire 13 which surrounds the plates 12 and forms an additional reinforcement for the pole at the ground line 8.

The lower ends of the plates 12 are formed with terminal piercing points 14 similar in construction to the piercing points 10 of the plates 9 while the upper ends thereof are provided with corresponding annular flanges 15 which form driving heads for the outer or auxiliary housing of the pole.

The plates constituting the inner and outer housings of the pole may be rigidly secured thereto in any suitable manner but it is preferred to secure the same on said pole by means of nails, screws or similar fastening devices 16 which pierce the reinforcing flanges 11 and 15, as best shown in Fig. 1 of the drawings.

In order to brace the pole against lateral strains said pole is provided with one or more inclined braces 17 having their lower ends provided with terminal anchoring shoes 18 and their upper ends pivotally mounted between suitable supporting lugs 19 formed on the reinforcing flange or driving head 11 of the inner casing or housing. If desired, however, the inclined braces 17 may be secured to a separate collar or sleeve and the latter clamped in position on the pole above and in spaced relation to the flange 11 of the inner casing or housing.

When it is desired to reinforce and strengthen a decayed or weakened portion of the pole the longitudinal plates 9 are placed in position against the exterior walls of the pole and then driven into the ground by striking the driving heads 11 with a mallet or other suitable tool after which said plates are rigidly secured to the pole by means of the nails or fastening devices 16.

The plates 12 forming the outer casing or housing are then placed in position over the plates 9 with the central portions of the plates 12 over-lapping the adjacent longitudinal edges of the plates 9 and said outer plates driven into the ground by tapping the driving heads 15 of said plates, in the manner before stated.

When the inner or outer casings of the posts are thus assembled the same are wrapped with the binding wire 13, and the inclined braces 17 attached to the ears 19 by means of the bolts 20.

Attention is here called to the fact that the plates forming the inner and outer housings are separate and independent of each other and are held in assembled or tubular form after they have been driven into the ground by means of the fastening devices 16.

It will of course be understood that the plates forming the inner and outer casing may be placed in position on the pole before the latter is set into the ground, or the plates 9 forming the inner housing may be secured to the pole prior to embedding said pole in the ground and the outer plates 12 secured to the inner plates 9 after the pole has been set up for use.

In Fig. 3 of the drawings there is illustrated a modified form of the invention in which the plates or sections 21 and 22 forming the inner and outer casings are disposed in superposed alinement instead of being arranged in staggered relation, as shown in Fig. 1, said plates being secured in position on the pole by means of a clamp or similar fastening device 23.

In Fig. 4 of the drawings the upper ends of the plates 24 are reinforced and strengthened by short auxiliary plates 25 which may be welded, soldered or otherwise rigidly secured thereto. In this form of the device the upper end of each plate 24 is provided with a terminal reinforcing flange 26 the opposite ends of which are extended laterally beyond the adjacent longitudinal edges of the plates to form perforated ears 27 adapted to receive suitable clamping bolts 28 which pierce the perforations of an adjacent ear and serve to hold the several plates in assembled position on the pole. One or more inclined braces 28' are pivotally supported on the bolts 28 to assist in maintaining the pole in upright position.

In Fig. 5 of the drawings there is illustrated a further modification in which the outer or auxiliary casing is dispensed with, the housing being formed of longitudinal plates 29 having their lower ends inclined to form terminal points and their adjacent longitudinal edges over-lapped and riveted to each other and to the pole as indicated at 30, while in Fig. 6 the spaced plates or sections 31 are fastened in position by a clamping band or collar 32.

The casing or housing shown in Fig. 7 of the drawings is especially designed for attachment to the base of the pole before the latter is set into the ground, said casing or housing being preferably formed of a single strip of metal bent to conform to the shape of the pole and having its adjacent longitudinal edges over-lapped and secured to the pole by rivets or similar fastening devices 33. In this form of the device the upper end of the casing may or may not be formed with a terminal reinforcing flange or head 34.

The pole shown in Fig. 8 of the drawings is substantially rectangular in cross section and may be used on a fence post if desired. In this form of the device the corners of the post are reinforced and strengthened by angle bars 35.

In Figs. 9 and 10 there is illustrated a modified form of brace in which the bars 36 are twisted at 37 and thence bent upon themselves at 38 to form angularly disposed shoes 39 adapted to be embedded in the ground on each side of the pole, said bars being pivotally connected with the clamping sleeve or collar 40. The braces shown in this form of the device may be used in connection with the different forms of casings or housings shown in the several figures of the drawings, or if desired, may be employed for bracing poles and fence posts not having said housings attached thereto.

The casings or housings may be made in different sizes and shapes and may be galvanized, plated or otherwise coated to protect the same against the action of the elements.

From the foregoing description it is thought that the construction and operation of the device will be readily understood by those skilled in the art and further description thereof is deemed unnecessary.

Having thus described the invention what is claimed is:

1. The combination with a pole, of an inner casing surrounding the pole, and having one end thereof provided with a driving head and its opposite end formed with a driving point and an outer casing engaging the inner casing and provided with a corresponding driving head and driving point, the driving head of the inner casing being extended above the driving head of the outer casing.

2. The combination with a pole, of a casing secured to the pole and formed of independent sections each having one end thereof provided with a driving point and its opposite end bent upon itself to form a flange constituting a driving head, lugs extending from the flange, and braces secured to the lugs and provided with anchoring members.

3. The combination with a pole, of main and auxiliary casings formed of superposed plates disposed in staggered relation.

4. The combination with a pole, of main and auxiliary casings secured to the pole and formed of superposed plates, disposed in staggered relation and a binding element surrounding the auxiliary casing for locking both casings in position on the pole.

5. The combination with a pole, of an inner casing secured to the pole and formed of a plurality of independent sections, an outer casing formed of longitudinal plates overlapping the longitudinal edges of the plates forming the inner casing, and means for securing said casings in position on the pole.

6. The combination with a pole, of an inner casing secured to the pole and formed of independent sections each having one end thereof projected beyond the adjacent end of the pole and provided with a terminal driving point and its upper end provided with a reinforcing flange constituting a driving head, and an outer casing combined with the inner casing and provided with driving points the terminals of which are disposed at the juncture of the plates forming the inner section.

In testimony that I claim the foregoing as my own, I have hereto affixed my signature in the presence of two witnesses.

DENNIS C. VAN BUREN.

Witnesses:
R. F. FULTON,
W. N. KNOX.